June 16, 1964  A. P. DELANEY  3,137,775
CIRCUIT BREAKER INTERLOCK ASSEMBLY
Filed Oct. 28, 1960  3 Sheets-Sheet 1
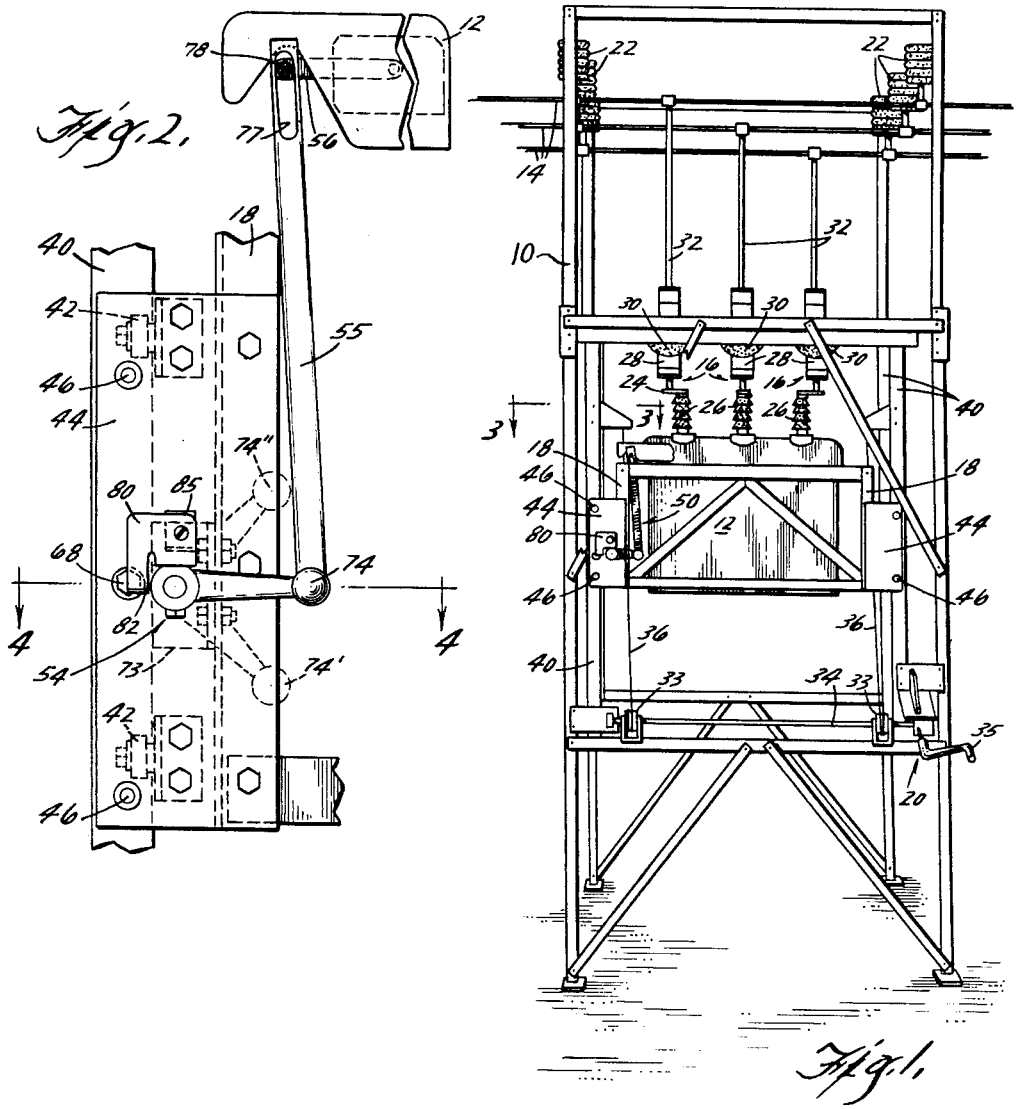
INVENTOR.
AUGUSTINE P. DELANEY
BY
Fred Wiviott
ATTORNEY.

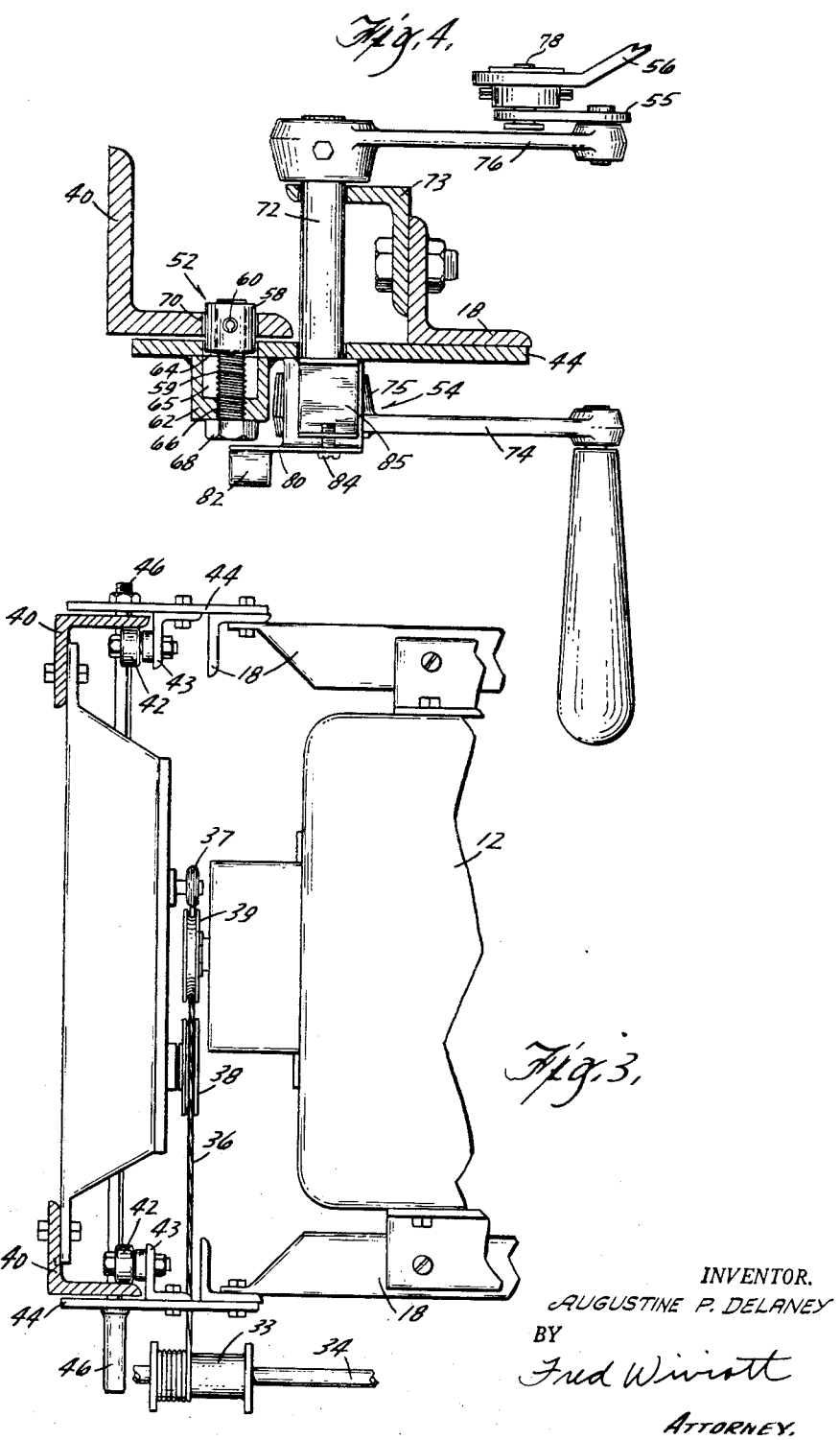

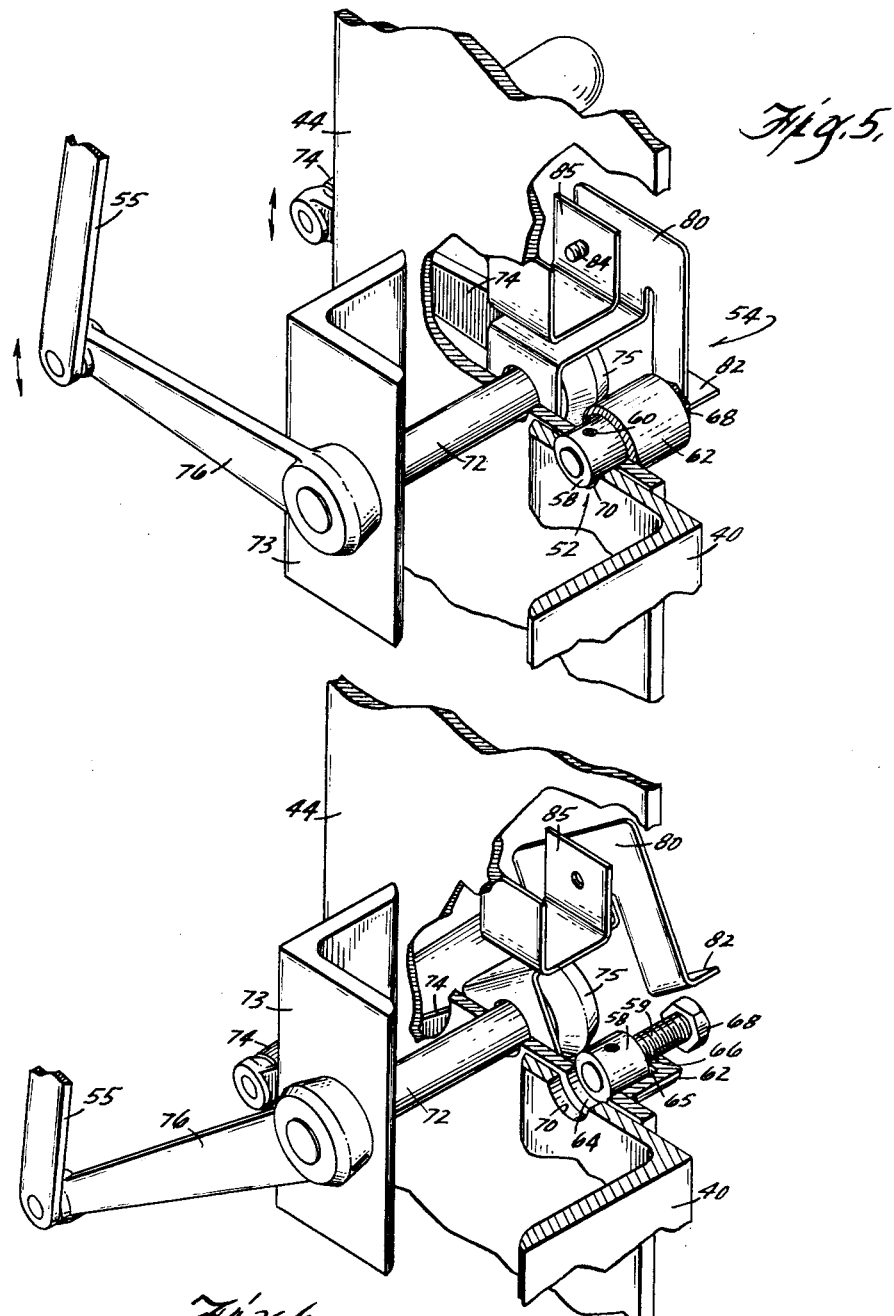

United States Patent Office 3,137,775
Patented June 16, 1964

3,137,775
CIRCUIT BREAKER INTERLOCK ASSEMBLY
Augustine P. Delaney, South Milwaukee, Wis., assignor to McGraw-Edison Company, Milwaukee, Wis., a corporation of Delaware
Filed Oct. 28, 1960, Ser. No. 65,650
3 Claims. (Cl. 200—50)

This invention relates to electrical switchgear and, more particularly, to interlock means therefor.

In substation installations electrical apparatus such as circuit breakers are often adapted to be removed from the system upon vertical or horizontal movement out of engagement with stationary bus bars carrying system power. The conventional arrangement comprises a stationary metallic frame upon which bus bars, load conductors and accessory apparatus are disposed and a movable unit consisting of a circuit interrupter or the like which is connectable, by disconnect contacts, to the bus bars and load conductors. Each of the disconnect contacts generally includes a stationary portion affixed to the frame and electrically connected to the bus bars and the load conductors and a coacting portion carried by the movable unit. In addition, the circuit interrupter includes interrupting contacts disposed in arc extinguishing structure for interrupting the load current. The disconnect contacts, however, are not designed to withstand arcing and would quickly become scarred and pitted if the circuit interrupter were moved into or out of its connected position while its interrupting contacts were closed.

It is a primary object of the invention to provide interlocking means for preventing a drawout type switchgear unit from being moved into or out of its connected position relative to stationary disconnect contacts when its interrupting contacts are in their closed position.

Another object of the invention is to provide a drawout type switchgear unit with means for preventing the reclosure of its interrupting contacts when the unit is out of its connected position.

These and other objects and advantages of the invention will become more apparent from the detailed description of the invention taken with the accompanying drawings in which:

FIG. 1 shows a vertically movable circuit breaker mechanism having an interlock assembly according to the instant invention;

FIG. 2 is an elevational view of the interlocking mechanism according to the instant invention;

FIG. 3 is a view taken along lines 3—3 of FIG. 1;

FIG. 4 is a view taken along lines 4—4 of FIG. 2; and

FIGS. 5 and 6 are perspective views, with parts broken away, illustrating the method of operation of the interlock assembly.

Referring to the drawings in greater detail, FIG. 1 shows a metallic supporting frame 10 in which a three-phase repeating circuit interrupter 12 is mounted for vertical movement relative to bus bars 14. When the circuit interrupter is in its elevated position, shown in FIG. 1, it is electrically connected to the bus bars 14 and load conductors (not shown) by disconnect contacts 16. The circuit breaker 12 is secured to a rack 18 which is mounted on frame 10 for vertical movement by any suitable lifting mechanism, such as the windlass, indicated generally by the reference numeral 20. The bus bars 14 are supported vertically above the circuit breaker 12 in the upper portion of the frame 10 by insulators 22. The disconnect contacts 16 each includes a movable contact 24 mounted on the upper end of each of the circuit breaker's bushings 26 and a cooperating fixed contact 28 mounted on frame 10 by insulators 30. Each of the line stationary disconnect contacts 28 is electrically connected to bus bars 14 by conductors 32. The disconnect contacts 16 are shown and discussed in greater detail in copending application, Ser. No. 860,821, filed December 21, 1959, now Patent No. 3,070,770, issued December 25, 1962, and assigned to the assignee of the instant invention.

The hoisting windlass 20 is shown to include a pair of drums 33 affixed to a shaft 34 which is adapted to be rotated by a crank 35 and thereby raise and lower the circuit breaker 12 by means of a pair of cables 36. As seen in FIG. 3, each cable 36 is affixed at one end to its associated drum 33 and at its other end to the frame 10 at 37 and each extends around a first pulley 38 mounted on the frame 10 and a second pulley 39 mounted on the circuit breaker 12.

The rack 18 which supports circuit breaker 12 is guided in its vertical movement by a pair of vertically mounted, parallel rails 40 disposed on a pair of opposite sides of the frame 10 and which are each engageable by a pair of vertically spaced apart rollers 42 secured by brackets 43 to a guide plate 44 which in turn is affixed to each of the corners of rack 18 and which lies in planes parallel to the lateral sides of circuit breaker 12. Circuit breaker 12 is affixed in its connected position shown in FIG. 1 by means of elongate pins 46 which extend through aligned openings in each of the guide plates 44 and their adjacent guide rails 40 on the opposite sides of rack 18 and which must be removed before the circuit breaker 12 can be lowered.

The invention comprises an interlock mechanism 50 for preventing downward movement of the circuit breaker 12 out of its engaged position relative to disconnect contact 16 until after its interrupting contacts have been opened. The interlock mechanism 50 includes a locking means 52 mounted on the rack 18 and releasably engageable with one of the guide rails 40 to prevent movement of the rack 18 relative to the frame 10. Movement of the locking means 52 out of engagement with the frame 10 is normally prevented by an operating assembly 54 which is connected by a slotted link 55 to the trip arm 56 of the circuit breaker 12, as shown in FIG. 2. Movement of the operating assembly 54 to a position where it no longer prevents the displacement of locking means 52 out of engagement with the frame 10, is operative to pivot the trip arm 56 of circuit breaker 12 and thereby open its interrupting contacts. It will be appreciated, therefore, that the interlock mechanism 50 prevents movement of circuit interrupter 12 out of its connected position until after its interrupting contacts have been opened.

More specifically, the locking means 52 includes a cylindrical sleeve 58 affixed to the end of a threaded lock bolt 59 by means of a roll pin 60. The lip of a cup-shaped bushing 62 is affixed to the guide plate 44 and has an opening in its base which is in registry with a circular aperture 64 in guide plate 44. The bushing 62 and aperture 64 thereby provide a cylindrical recess 65 coaxial with and having a slightly larger diameter than the cylindrical sleeve 58 of the locking means 52. The lock bolt 59 extends through a threaded aperture 66 in the base of bushing 62 so that sleeve 58 is coaxial with the recess 65. The lengths of sleeve 58, recess 65 and lock bolt 59 are so related that when the lock bolt 59 is turned until its head 68 engages the outer surface of bushing 62, the sleeve 58 will be substantially out of recess 65. On the other hand, when lock bolt 59 is turned in the opposite direction so that the end of sleeve 58 engages the bottom of recess 65, said sleeve will be entirely within recess 65.

When the circuit breaker 12 is in its connected position shown in FIG. 1, the recess 65 will be coaxial with an opening 70 formed in the adjacent rail member 40. As a result, when the disconnect contacts 16 are closed and when lock bolt 59 is turned to its locked position, sleeve 58 will be disposed within opening 70, as shown in FIG. 4, so that movement of the rack 18 relative to the rail 40 is prevented.

The operating assembly 54 includes an operating shaft 72 journalled at one end of the guide plate 44 and at its other end in one leg of an L-shaped bracket 73 whose other leg is affixed to the rack 18. An operating handle 74 is affixed to operating shaft 72 adjacent the outside surface of guide plate 44 by means of a hub 75, while an operating lever 76 is affixed to its other end. The end of operating lever 76 remote from shaft 72 is pivotally connected to the lower end of the trip link 55 whose upper end has a slot 77 formed therein which loosely engages a pin 78 affixed to the trip arm 56 of the circuit breaker 12. It can be seen, therefore, from FIGS. 5 and 6 that downward rotation of operating handle 74 will pivot operating lever 76 in a clockwise direction to move trip link 55 downwardly. This results in the counterclockwise rotation of trip arm 56 as viewed in FIG. 2. As is more fully discussed in Patent No. 2,804,521 to A. Van Ryan et al., such counterclockwise movement of trip arm 56 will open the interrupting contacts of the circuit breaker 12.

A bracket member 80 is affixed to the hub 75 of operating handle 74 and has an L-shaped arm 82 which is offset from the axis of operating shaft 72 and which extends downwardly to a point adjacent the end of lock bolt 59 when the operating assembly 54 is in its unpivoted position shown in FIGS. 4 and 5. It can be seen, therefore, that when the operating mechanism 54 is in this position bracket 82 prevents the rotation of lock bolt 59 and hence the movement of sleeve 58 out of the aperture 70 in rail member 40. It will be recalled, too, that when the sleeve 58 is in this position a rigid connection is achieved between the rack 18 and the frame 10 so that the movement of circuit breaker 12 relative to the stationary disconnect contacts 28 is prevented. It will be appreciated, therefore, that in order to move the arm 82 of bracket 80 out of the path of the head 68 of lock bolt 59 it is necessary to rotate operating handle 74 in a clockwise direction as viewed in FIG. 5 whereupon the interrupting contacts of the circuit breaker 12 are opened. When the operating handle is in its pivoted position, as seen in FIG. 6, lock bolt 59 may then be rotated until sleeve 58 is within the recess 65. Then, assuming that the long pins 46 have been removed, the circuit breaker 12 may be lowered by the windlass 20.

In order to prevent accidental rotation of the operating handle 74 a lock screw 84 threadably engages bracket 80 and one leg of a U-shaped bracket 85 whose other leg is affixed to the guide plate 44. Hence, in order to rotate operating handle 74 it is first necessary to remove the lock screw 84 and thereby open the rigid connection between operating handle 74 and guide plate 44.

After lock bolt 59 has been turned to place sleeve 58 within recess 65 and the lowering motion of circuit breaker 12 has begun, the recess 65 will no longer be in registry with the opening 70 in guide rail 40 so that sleeve 58 cannot be moved out of recess 65. Thus, the operating assembly 54 cannot be pivoted to its position shown in broken lines and indicated by the numeral 74″ in FIG. 1 to effect reclosure of interrupter 12, because, as seen in FIG. 6, the lock bolt 59 lies in the path of the lower end of bracket member 82. As a result, the interrupting contacts of the switchgear unit cannot be closed until the circuit interrupter 12 is returned to its connected position whereupon recess 65 and the opening 70 and guide rail 40 are again in registry. It can be seen, therefore, that the interlock assembly 54 according to the instant invention not only prevents movement of the circuit breaker 12 out of its connected position until after its interrupting contacts have been opened but it also prevents the reclosure of said interrupting contacts until after the circuit breaker has been returned to its connected position, after a lowering operation.

Referring now to FIG. 2, it can be seen that when the trip arm 56 of circuit breaker 12 is in its closed position, the pin 78 coupling it to link 55 is held in an intermediate position relative to slot 77 by lock screw 84. This frees the trip arm 56 from bearing the weight of link 55 and thereby eliminates the possibility of a downward force on arm 56 causing premature lockout of circuit breaker 12. In addition, slot 77 allows arm 56 to rotate through a slight counterclockwise angle to indicate when lockout has occurred electrically.

While only a single embodiment of the invention has been shown and described, it is intended to cover in the appended claims all modifications and embodiments that fall within the true spirit and scope of the invention.

I claim:

1. A switchgear assembly including a stationary supporting frame, a circuit breaker unit having a plurality of movable disconnect contacts mounted thereon and being engageable with coacting stationary disconnect contacts mounted on said frame, means for moving said circuit breaker unit vertically relative to said supporting frame to selectively engage and disengage said disconnect contacts, operating means coupled to said circuit breaker unit and movable from a first to a second position to effect the opening of said circuit breaker unit, locking means mounted on said circuit breaker unit and constructed and arranged for movement into and out of locking engagement with said supporting frame when said disconnect contacts are in their connected position, the first position of said operating means being in the path of movement of said locking means to prevent its movement out of locking engagement with said supporting frame when said operating means is in its first position, said second position being remote from said path, said locking means lying between said first and second positions when it is out of locking engagement with frame to prevent the movement of said operating means to said first position, whereby said circuit breaker unit cannot be reclosed.

2. A switch gear assembly including a stationary supporting frame, a circuit breaker unit having a plurality of movable disconnect contacts mounted thereon and being coactable with a plurality of stationary disconnect contacts mounted on said frame, means for moving said circuit breaker unit vertically relative to said supporting frame to selectively engage and disengage said disconnect contacts, operating means coupled to said circuit breaker unit and movable in a plane from a first to a second position to effect the opening of said circuit breaker unit, lock receiving means in said frame, lock means mounted on said circuit breaker unit adjacent said lock receiving means and constructed and arranged for movement into and out of locking engagement therewith when said disconnect contacts are in their connected position, said lock means being displaced from said lock receiving means so that locking engagement cannot be effected when said contacts are out of their connected position, the first position of said operating means being in the path of movement of said lock means to prevent its movement out of locking engagement with said supporting frame whereby said disconnect contacts cannot be disengaged when said breaker unit is closed, said second position being remote from said path, said lock means intersecting said plane at said first position when it is out of locking engagement with said lock receiving means to prevent the movement of said operating means thereto whereby said circuit breaker unit cannot be reclosed.

3. A switchgear assembly including a stationary supporting frame, a circuit breaker unit having a plurality of movable disconnect contacts mounted thereon and being coactable with a plurality of stationary disconnect contacts mounted on said frame, means for moving said circuit breaker unit vertically relative to said supporting frame to selectively engage and disengage said disconnect contacts, operating means coupled to said circuit breaker and movable in a plane from a first to a second position to effect the opening of said circuit breaker unit, an aperture formed in said supporting frame, a locking member mounted on said circuit breaker unit in registry with said aperture and movable longitudinally into and out of locking engagement therewith when said disconnect contacts are in their connected position, said locking member being movable out of registry with said aperture when said circuit breaker unit is moved to a position where said movable disconnect contacts are out of their connected position, a bracket member mounted on said operating means and movable therewith, the first position of said bracket member being in the path of said locking member to prevent its movement out of locking engagement with said aperture when said circuit breaker unit is closed, said bracket member being remote from said path to permit movement of said locking means out of locking engagement when said circuit breaker unit is open, said locking member being at the first position of said bracket when it is out of engagement with aperture to prevent the movement of said operating means whereby said circuit breaker unit cannot be reclosed.

References Cited in the file of this patent

UNITED STATES PATENTS

| | | |
|---|---|---|
| 1,929,983 | Macneil | Oct. 10, 1933 |
| 2,443,664 | Rothfus | June 22, 1948 |
| 2,840,652 | Eichelberger et al. | June 24, 1958 |
| 2,914,635 | Lester et al. | Nov. 24, 1959 |
| 2,914,707 | Timmerman | Nov. 24, 1959 |
| 3,008,016 | Mercier | Nov. 7, 1961 |

FOREIGN PATENTS

| | | |
|---|---|---|
| 238,149 | Germany | Sept. 19, 1911 |